Oct. 24, 1967  G. G. TAYLOR  3,348,972
APPARATUS FOR CONTINUOUS CONVERSION OF STARCH
Original Filed March 9, 1961
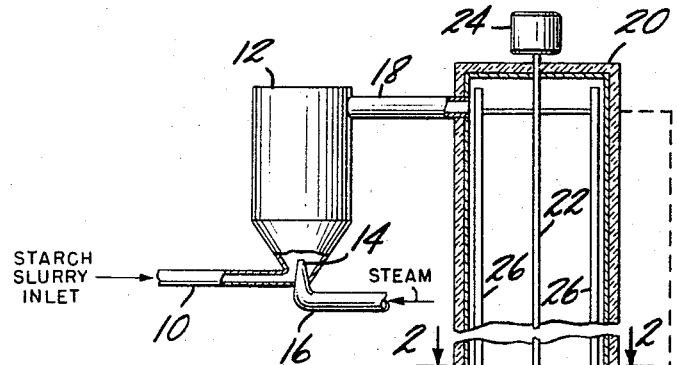
FIG. 1
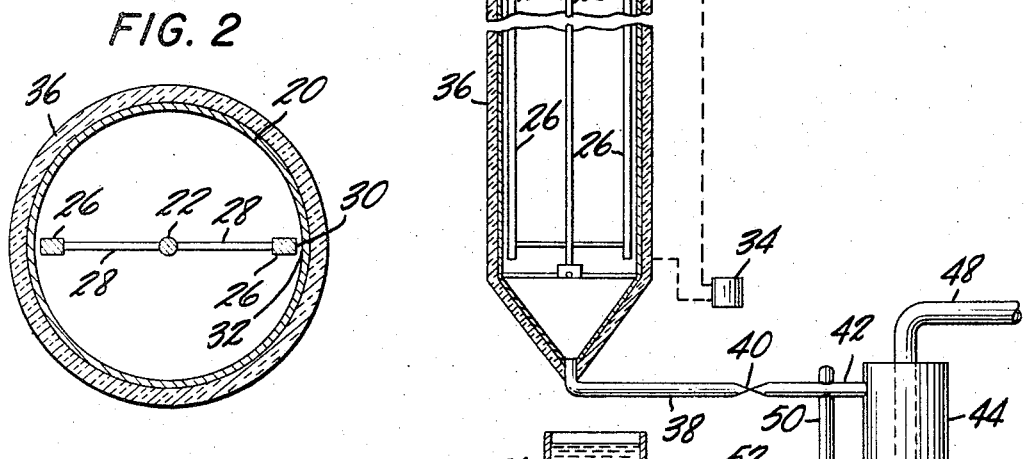
FIG. 2
FIG. 3
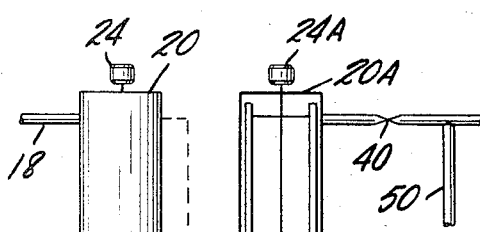
INVENTOR.
GERWIN G. TAYLOR
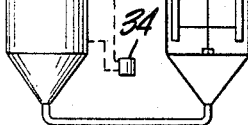
ATTORNEYS 3,348,972
APPARATUS FOR CONTINUOUS CONVERSION OF STARCH
Gerwin G. Taylor, Flossmoor, Ill., assignor to American Maize-Products Company, a corporation of Maine
Original application Mar. 9, 1961, Ser. No. 94,515, now Patent No. 3,169,083, dated Feb. 9, 1965. Divided and this application Feb. 19, 1964, Ser. No. 345,929
5 Claims. (Cl. 127—28)

This application is a division of co-pending application Serial No. 94,515, filed March 9, 1961, now U.S. Patent No. 3,169,083 granted February 9, 1965.

This invention relates to a method and apparatus for the continuous conversion of starch.

In many prior art continuous processes for the conversion of starch into dextrose and related intermediate products an acid catalyzed aqueous slurry of starch is customarily heated to reaction temperature under super atmospheric pressures by injection of live steam therein and the slurry is held under such reaction conditions in a closed vessel known as a converter for a sufficient period of time until the desired degree of hydrolytic break-down of the starch into sugars has been obtained. Thereafter, the reaction liquor is flashed into a suitable vessel at atmospheric pressure, volatile residues are removed and the remaining sugary syrup is neutralized.

The holding time of starch slurry in the converter is a critical part of this process. All other reaction variables being constant, the degree of conversion, known in the trade as the dextrose equivalent (D.E.), increases as the holding time is lengthened but long holding times lead to the formation of objectionable discoloration in the conversion product and should be minimized. Since the starch slurry moves continuously through the converter, the holding time is a function of the rate of flow and the volume capacity of the converter and one of the serious problems in the prior art processes has been the failure to achieve a continuous uniform flow through the converter. As a result the starch slurry in part tends to be overcooked and undercooked so that as a practical matter the final D.E. of the conversion product is difficult to control and subject to wide variation.

We have now devised an apparatus for use as a converter for the starch slurry which makes it possible to achieve completely uniform flow of the slurry and exceptional control over the D.E. value of the conversion product. In the converter of our invention there is no tendency for axial intermixing of portions of the starch slurry along the length of the converter as may be caused by turbulent flow or by slippage of concentric tubes of slurry from the frictional drag of the inside converter wall and in accordance with the present invention a cross sectional area of the slurry is caused to move uniformly through the converter so that holding time may be controlled to give a final product with D.E. held within narrow well defined limits.

The converter comprises a cylindrical vessel having at least one paddle blade extending along the length of the vessel. The blade is attached to a rotatable central shaft by means of horizontal arms and the spacing of the blade gives a slight clearance between the inside wall of the vessel and the outer edge of the blade.

As the mixture of steam and starch slurry under reaction temperature and pressure enters this vessel, the central shaft and the blade is rotated at controlled speed sufficient to disrupt the laminar flow pattern of the slurry in the area adjacent the inside wall of the vessel. In the absence of agitation there is a drag exerted on the outer concentric portions of the slurry which slows the movement of these portions as compared to the central portion so that the flow pattern is laminar, that is, an increasing relative slippage between concentric tubes of slurry from the outer to the inner portions of the slurry. The agitation provided in the converter of this invention tends to break up this laminar flow pattern and prevent the central portion of the slurry from moving through the converter at a greater speed than the outer portion. As a result a cross sectional unit volume of slurry moves continuously through the converter in uniform manner over the proper holding time and the slurry is converted to a substantially uniform D.E. product.

As mentioned hereinabove the converter has at least one blade positioned adjacent the inside wall of the converter to give a slight clearance therewith. This clearance need not be uniform throughout, that is, the radial distance between the outermost edge of the blade and the inside wall need not be the same throughout the length of the blade. The blade edge can have serrations or the blade itself may be angled away from a vertical position in which case it is also suitably curved to permit rotation in the cylindrical converter. In the preferred form of converter illustrated in the drawings there are two blades spaced diametrically opposite each other and parallel to the vertical axis of the converter. This construction has proven to be quite satisfactory but it is recognized that other specific forms of blades and more than one or two blades may also be employed.

As to control speed of rotation, in working with a converter of the type shown in the drawings having a diameter of one foot, it has been found that the peripheral speeds of rotation of the blades should be controlled preferably at about 15 to about 53 feet per minute. The term peripheral speed of rotation means the angular velocity of the blade relative to the stationary converter wall as the blade is rotating. The above specified range is preferred but peripheral speeds of rotation of about 10 to about 100 feet/min. may be employed with satisfactory results. Also, depending on the physical characteristics of the selected converter such as diameter, shape, texture of interior wall surface, number of blades employed and the like, speeds of rotation outside those specified herein may be employed to achieve equivalent results of breaking up the laminar flow pattern of the starch slurry without departing from the spirit and scope of the invention. In all cases the selected speed of rotation should not cause axial intermixing of the slurry during flow through the converter.

Preferably the walls of the converter are insulated so that the total heat will be contained in the slurry during the holding time. The rate of flow of the slurry is correlated with the actual dimensions of the converter and the level of fluid in the converter in order to establish the holding time required for the particular D.E. product being manufactured. For this purpose the converter is equipped with conventional automatic fluid level controls which will maintain the fluid level at any desired point. For example, if the rate of flow of the slurry is 12 gal./min. and the volume capacity of the converter is 144 gal., the average holding time for a unit volume of slurry moving through the converter when completely filled would be about 12 minutes. By maintaining the converter only about 80% full, the holding time will be reduced to 10 minutes for the same slurry flow rate.

It is possible with the converter of this invention to form starch conversion products having D.E. values from essentially 0, i.e. cooked starch, to as high as 95. It is also possible to convert starch slurries of a density anywhere between 0° Bé and 24° Bé or more and low D.E. syrups can be upgraded to syrups having higher D.E. values.

For a better understanding of further details of this invention reference will be made to the accompanying drawings which illustrate a preferred form of structure in which:

FIG. 1 is a diagram of starch processing equipment utilizing the apparatus of this invention shown in axial section.

FIG. 2 is a cross-section taken along line 2—2 of FIG. 1.

FIG. 3 illustrates a modified form of the apparatus of FIG. 1.

As shown in FIG. 1 a starch slurry inlet line 10 is connected to a conventional jet heater 14, such as a Schutte and Koerting continuous heater, into which steam under super atmospheric pressures is fed into the starch slurry by the steam line 16. A connecting line 18 runs from the heater and empties into the top of the cylindrical vessel or converter 20. The converter is equipped with a centrally located shaft 22 which is connected to the shaft of a driving mechanism 24. Two rectangular paddle blades 26 are connected to the central shaft by means of arms 28. As shown in FIGS. 1 and 2 the blades extend substantially throughout the length of the vessel 20, are parallel therewith and are positioned diametrically opposite each other. There is a slight clearance between the outermost longitudinal end faces 30 of the blades and the inside wall 32 of the vessel. The vessel is equipped with an automatic fluid level control 34 of conventional type and the walls of the vessel are provided with insulation 36 to prevent loss of heat.

The bottom portion of the vessel is preferably cone shaped and leads to outlet line 38. The outlet line 38 connects to one side of a discharge valve 40. The other side of the valve is connected to line 42 which empties into a conventional cyclone type liquid-vapor separator 44. The separator has a product discharge line 46 at the bottom thereof and a vent line 48 for flashing off volatile vapors. Between the discharge valve and the separator, line 42 is tapped with line 50 leading from the pump 52 which is connected to a holding tank 54. From the heater 12 up to the discharge valve, 40, the equipment is reinforced to withstand super atmospheric pressures. Except for the converter, the rest of the apparatus described hereinabove is well known conventional equipment readily available on the open market and a detailed description of such equipment is not deemed necessary as it forms no part of our invention.

The dimensions of the specific form of converter illustrated in the drawings are a diameter of one foot and a length of twelve feet in the cylindrical vessel. The paddle blades are ¼ inch thick and two inches wide. They are attached to a 1½ inch diameter round center shaft by means of the three horizontal arms which are ¾ inch diameter round bars. The position of the blades is such that there is a clearance of approximately ¼ inch between the outermost edges of the blades and the inside wall of the tank.

In the operation of the above described apparatus an aqueous slurry of starch catalyzed in conventional manner with an acid catalyst such as hydrochloric, sulfuric or phosphoric acid, is continuously pumped into the heater 12. Super atmospheric steam passing through the steam line 16 and jet 14 violently commingles with the slurry whereby the temperature of the slurry is substantially instantaneously raised to reaction temperatures between about 240° F. to 325° F. under super atmospheric pressures. The slurry then passes into converter 20, the paddle blades 26 of which are turning at a controlled speed as described hereinabove.

As the starch slurry moves down through the converter the paddle blades break up the laminar flow pattern of the portion of the slurry which is near the inside wall of the converter so that a unit volume of slurry falls through the converter in completely uniform manner. The automatic level control 34 maintains the converter filled to any desired level of slurry and this, in combination with control of the rate of flow of the slurry, provides a means for holding the slurry under the reaction conditions for conversion over holding times of about 1 to about 150 minutes. After reaching the bottom of the converter the hydrolyzed slurry passes through line 38 to the valve 40 where it is flashed into line 42 at atmospheric or slightly higher pressure. The acid catalyst in the conversion product is continuously neutralized in conventional manner with aqueous alkali which is pumped from the holding tank 54 up through line 50 and into the stream of conversion product flowing through line 42. The neutralized liquid conversion product then passes into the separator 44 where volatile residues are flashed off and the product is discharged through line 46. The volatile residues consist primarily of low pressure steam vapors which may be utilized to preheat the feed starch slurry, other process liquors, or water.

From the foregoing description it is obvious that the dimensions of the apparatus and the various reaction factors of the process are variable within wide limits to suit the needs in each particular case. In general, conversion products up to 80 D.E. are satisfactorily made with starch slurries of about 23° to 24° Bé. For products of higher than 80 D.E. preferably the density of the starch slurry is about 10° to 15° Bé. In order to give an idea of the possible sets of values that may be used in producing various D.E. conversion products the following examples are given. The examples are given in terms of operation of the converter illustrated in the drawings.

*Example 1*

Typical operating conditions to produce a 30 D.E. syrup are:

| | |
|---|---:|
| Density of starch slurry _____° Bé__ | 23.0 |
| Amount of 20° Bé hydrochloric acid, vol. percent__ | 0.21 |
| Steam pressure _____p.s.i__ | 130 |
| Slurry flow rate _____gal./min__ | 12 |
| Conversion temperature _____° F__ | 274 |
| Pressure in converter _____p.s.i__ | 30 |
| Holding time _____min__ | 10 |
| Peripheral speed of rotation _____ft./min__ | 53 |

*Example 2*

Typical operating conditions to produce a 42 D.E. syrup are:

| | |
|---|---:|
| Density of starch slurry _____° Bé__ | 23.0 |
| Amount of 20° Bé hydrochloric acid, vol. percent__ | 0.21 |
| Steam pressure _____p.s.i__ | 125 |
| Slurry flow rate _____gal./min__ | 12 |
| Conversion temperature _____° F__ | 282 |
| Pressure in converter _____p.s.i__ | 36 |
| Holding time _____min__ | 10 |
| Peripheral speed of rotation _____ft./min__ | 40 |

*Example 3*

Typical operating conditions to produce a 54 D.E. syrup are:

| | |
|---|---:|
| Density of starch slurry _____° Bé__ | 23.0 |
| Amount of 20° Bé hydrochloric acid, vol. percent__ | 0.21 |
| Steam pressure _____p.s.i__ | 130 |
| Slurry flow rate _____gal./min__ | 12 |
| Conversion temperature _____° F__ | 291 |
| Pressure in converter _____p.s.i__ | 44 |
| Holding time _____min__ | 10 |
| Peripheral speed of rotation _____ft./min__ | 30 |

*Example 4*

Typical operating conditions to produce a 92 D.E. syrup are:

| | |
|---|---:|
| Density of starch slurry _____° Bé__ | 12.0 |
| Amount of 20° Bé hydrochloric acid, vol. percent__ | 0.32 |
| Steam pressure _____p.s.i__ | 125 |
| Slurry flow rate _____gal./min__ | 6 |
| Conversion temperature _____° F__ | 310 |
| Pressure in converter _____p.s.i__ | 63 |
| Holding time _____min__ | 24 |
| Peripheral speed of rotation _____ft./min__ | 15 |

Although the converter has now been specifically described in connection with two spaced paddle blades, as mentioned hereinabove, it is possible to use more than two blades spaced equidistant from each other around the inside wall of the converter. In general if the diameter of the converter is substantially greater than one foot it is recommended that more than two paddle blades be employed and the blades be rotated at peripheral speeds slower than those used in the smaller diameter converter in duplicating a D.E. product made with the smaller diameter converter. In all cases it is important that the maximum speed of rotation not disrupt the flow of slurry to the point of causing turbulence or axial mixing which reduces the uniformity of the D.E. value of the conversion product and therefore, is highly undesirable.

One modification of the invention is shown in FIG. 3. The conduit 38 leads to a second vessel 20A similar in construction to the first vessel 20 and the starch conversion product is discharged here from an outlet port adjacent the top of the second vessel. This modification will permit longer holding times at the same flow rate or higher flow rates at the same holding time or many additional variations of holding times and flow rates without the converter being excessively long.

It will be understood that it is intended to cover all changes and modifications of the preferred embodiment of the invention herein chosen for the purpose of illustration which do not depart from the spirit and scope of the invention.

What is claimed is:

1. An apparatus for a continuous process of converting acid catalyzed starch slurries into dextrose and related intermediate products by subjecting said slurries to heat and pressure comprising a closed cylindrical vessel having an inlet port, an outlet port and a central rotatable shaft, at least one paddle blade attached to said shaft, said paddle blade extending substantially throughout the vessel and being positioned closely adjacent the inside wall of the vessel to provide a slight clearance space therebetween, means for rotating said paddle blade at angular peripheral speeds equivalent to 10 to 100 feet per minute for a vessel one foot in diameter, and means for maintaining the level of fluid slurry in said vessel at a predetermined height.

2. An apparatus in accordance with claim 1 in which the walls of the vessel are provided with insulation against loss of heat.

3. An apparatus in accordance with claim 1 in which the walls of the vessel are reinforced to withstand super atmospheric pressures.

4. An apparatus in accordance with claim 1 which includes two rectangular paddle blades spaced diametrically apart from each other.

5. An apparatus for a continuous process of converting acid catalyzed starch slurries into dextrose and related intermediate products by subjecting said slurries to heat and pressure comprising a closed cylindrical vessel having an inlet port and an outlet port for the continuous flow of starch slurry through said vessel, means for feeding slurry through the inlet port to cause the slurry to flow through the vessel and be discharged from the outlet port, at least one paddle blade extending substantially throughout the length of the vessel which paddle blade is positioned closely adjacent the inside wall of the vessel to provide a slight clearance space therebetween, a shaft for mounting the paddle blade, means for rotating the shaft and blade at a controlled rate of speed comprising an angular peripheral speed for said blade equivalent to 10 to 100 feet per minute for a vessel one foot in diameter, means for maintaining the level of fluid slurry in said vessel at a predetermined height, and pressure regulating means associated with the outlet port to control the pressure in the vessel and maintain the slurry under superatmospheric pressure therein.

References Cited

UNITED STATES PATENTS

| 1,369,053 | 2/1921 | Scott | 259—101 |
| 1,438,523 | 12/1922 | Duren | 259—49 |

FOREIGN PATENTS

| 157,384 | 7/1954 | Australia. |
| 639,707 | 12/1936 | Germany. |

JOSEPH SCOVRONEK, *Primary Examiner.*

MORRIS O. WOLK, *Examiner.*

E. G. WHITBY, *Assistant Examiner.*